March 16, 1937.  T. A. RICH  2,074,132
TEMPERATURE CONTROL DEVICE
Filed July 14, 1934
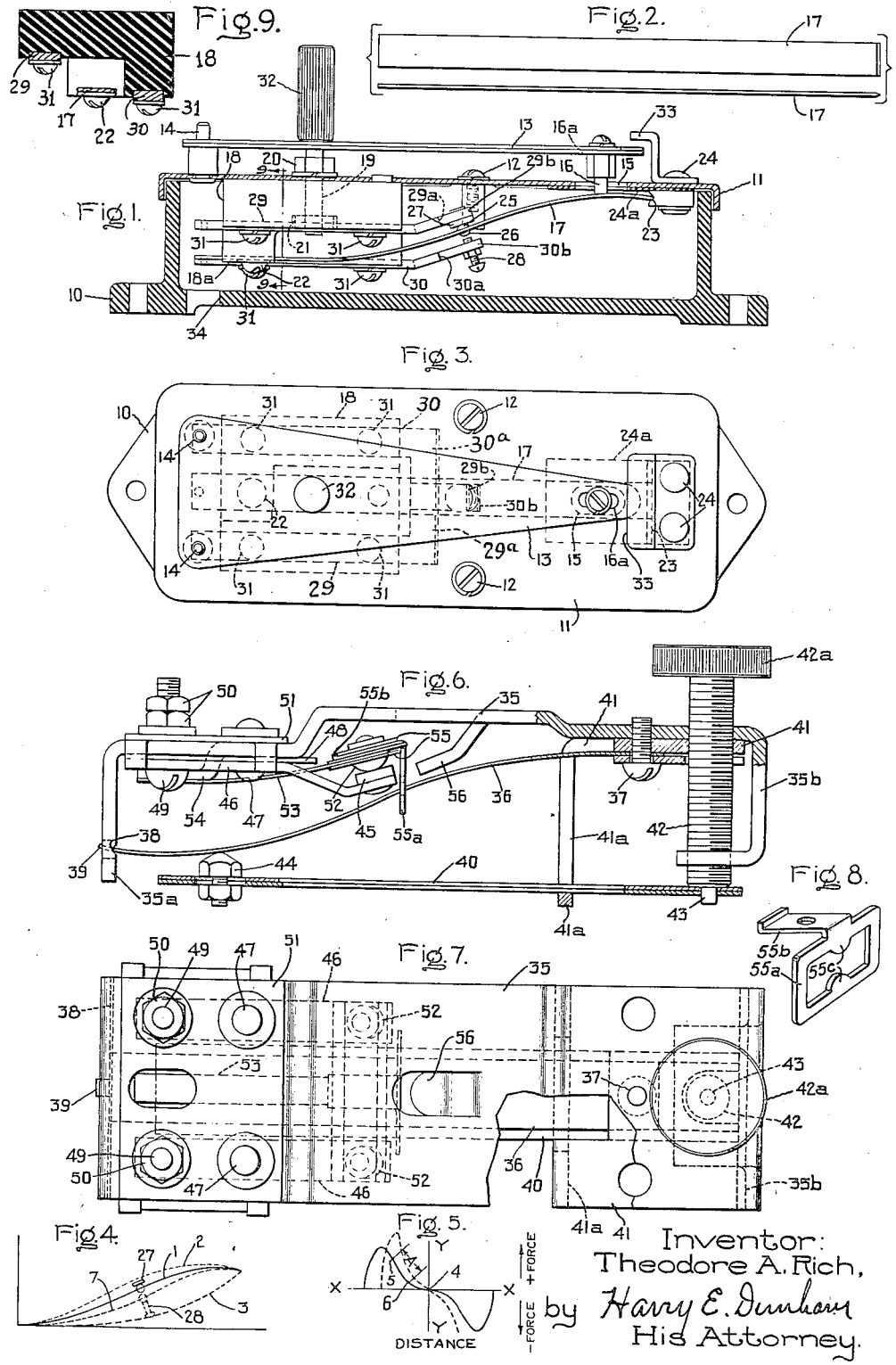
Inventor:
Theodore A. Rich,
by Harry E. Dunham
His Attorney.

Patented Mar. 16, 1937

2,074,132

UNITED STATES PATENT OFFICE 2,074,132

TEMPERATURE CONTROL DEVICE

Theodore A. Rich, Schenectady, N. Y., assignor to General Electric Company, a corporation of New York Application July 14, 1934, Serial No. 735,226

9 Claims. (Cl. 200—139)

This invention relates to temperature control devices, more particularly to temperature control devices for controlling an electric circuit, such as a heating circuit, in response to changes in temperature, and it has for its object the provision of a simple, reliable and efficient device of this character, and further, one which is quite inexpensive to make.

In certain temperature control devices heretofore used, there is provided a thermal responsive member, such as a bimetallic thermostat bar, which moves between controlling positions in response to changes in temperature. The movements of the bar between its controlling positions are utilized to control a switch or other control device. Cooperating with the thermal responsive bar is a spring arranged to snap from one side to the other of an axis of pressure and thus cause the bar to move quickly between its controlling positions. This spring at times has a spiral form, and in other applications is given an angular or curved shape. The spring after being shaped is heat treated to give it certain operating characteristics and to obtain certain strength requirements. It has been difficult to obtain uniform results as to strength and operating characteristics in heat treating these preformed springs, and because of this it has been difficult and expensive to make temperature responsive devices that will operate uniformly.

This invention obviates these manufacturing difficulties, and in additon provides a thermal responsive device which is simple in its construction and less expensive to make than certain other temperature responsive devices, heretofore known. In addition to this, the temperature responsive device of this invention is extremely sensitive and accurate in its operation.

In accordance with this invention, a flat, straight spring is secured in a supporting member or base in such manner that it takes a predetermined curvature. In one form of this invention, a thermal responsive member, such as a bimetallic thermostat bar, cooperates with the spring so as to apply a force to it. This bar and the spring are so related that the spring resists distortion or movement of the bar from one controlling position to another responsively to temperature changes in such manner that the spring force resisting the movement of the bar from its first to its second controlling position decreases more rapidly than the force applied by the bar causing its movement. This results in a snap or quick operation of the bar and spring to the second controlling position. The spring, however, continually tends to return to its initial position, that is, it continually applies a force to the thermostat bar biasing it to its first controlling position. A temperature condition reversed to that which caused the bar and spring to move to the second controlling position causes a reverse distortion of the thermostat, whereby its pressure on the spring decreases. This decrease takes place until eventually the spring force acting on the bar overcomes the resistance of the bar to the spring and the bar and spring return to their first controlling position. The force of the spring which decreasingly resisted the movement of the thermostat bar to the second controlling position now rapidly increases so as to snap or return quickly the thermostat bar to its initial controlling position.

In accordance with certain forms of this invention the spring is operably associated with a suitable switch so as to operate the switch between its opened and closed positions by movement of the spring.

For a more complete understanding of this invention, reference should be had to the accompanying drawing in which Fig. 1 is a vertical elevation section of a temperature responsive device embodying this invention; Fig. 2 illustrates a plan and elevation of the straight spring referred to above and used in the temperature responsive device of Fig. 1; Fig. 3 is a plan view of the temperature responsive device of Fig. 1; Figs. 4 and 5 are diagrammatic views illustrating the principle of operation of the temperature control device arranged in accordance with this invention, one form of which is shown in Figs. 1 to 3; Fig. 6 is an elevation of a modified form of temperature control device arranged in accordance with this invention; Fig. 7 is a plan view of the temperature responsive device of Fig. 6; Fig. 8 is a perspective view of a portion of the temperature control device shown in Figs. 6 and 7; and Fig. 9 is a sectional view taken through the line 9—9 of Fig. 1 and looking in the direction of the arrows.

Referring to the drawing, this invention has been shown in Figs. 1, 2 and 3 as applied to a temperature control device intended to control the heating circuits of incubators and the like, although it is to be understood that this device has general application. As shown in Figs. 1, 2 and 3, the control device comprises a base or casing 10 of rectangular form and made of any suitable electrically insulating material, such as a suitable phenol condensation product. The casing 10 is provided with a cover 11, which, as shown, is in the form of a metallic plate, and which is secured to the casing by screw fastening means 12.

Mounted on the outer surface of the plate 11 is a thermal responsive member 13, shown as a bimetallic thermostat bar. This bar is made of two strips of metal having dissimilar temperature coefficients of expansion, such as invar and steel, the strips being securely brazed or welded together lengthwise. The bar may have a triangular shape, as shown in Fig. 3, and will be arranged longitudinally of the plate with the base of the triangle at one end, the left-hand end of the plate, as viewed in Figs. 1 and 3. The bimetallic bar 13 is supported at the base of the triangle on a pair of studs 14 secured to the cover 11. The bar is provided with a pair of apertures for loosely receiving the studs. The opposite end of the bimetallic bar is free to move in response to changes in temperature. This end of the bar lies over an opening 15 provided in the cover 11, and supports a depending stud or rod 16 extending through this opening into the casing where it cooperates with certain control mechanism located within the casing 10 and arranged in accordance with this invention. The bar 13 is provided with an elongated slot 16a in which the stud 16 is mounted for adjustment longitudinally of the bar.

The control mechanism within the casing comprises a flat, flexible spring 17 supported within the casing so that it assumes a predetermined curvature, as shown in Fig. 1. The spring 17, as shown in Fig. 2, has initially a flat, straight form and only assumes its predetermined curvature when it is secured within the casing 10. This feature of the invention, that is, the utilization of a straight, flat spring, and securing it so as to give it a predetermined curvature, is a very important one, particularly from a manufacturing standpoint, because it is easy to obtain uniform strength and operating characteristics of flat straight springs by heat treatment, as compared with springs preformed into curved or angular shapes, etc. The spring in this particular form of the invention is formed of steel and is approximately 0.010 inch thick.

The spring 17, as shown in Fig. 1, is secured to the casing 10 so as to take a reversed curved form, that is, so that the opposite end portions of the spring are curved in opposite directions. The spring is rigidly secured at one end, its left-hand end, as viewed in Figs. 1 and 3, to an insulating supporting block 18 which in turn is rigidly secured to the plate 11 by means of a bolt 19. This bolt has nuts 20 and 21 threaded on its upper and lower end portions so as to clamp the support 18 to the plate 11. The spring 17 is rigidly secured to the central portion 18a of the support 18 by means of a screw 22. As shown, the left-hand end of the spring is secured to the support so as to lie in a predetermined plane. The opposite end of the spring 17 is formed with a knife-edge which rests in a bearing seat 23 provided for it, and secured to the plate 11 by means of rivets 24. This bearing and the spring are insulated from the plate 11 by means of a sheet of insulating material 24a secured by the rivets 24. The bearing seat 23 is positioned in a plane elevated with reference to the plane in which the left-hand end of the spring is fixed.

The bearing seat 23 is so arranged with reference to the opening 15 that the stud 16 carried by the bimetallic bar bears upon the spring 17 at a point relatively close to the seat 23.

Rigidly secured to opposite sides of the spring 17 substantially midway of its length are a pair of switch contacts 25 and 26. These contacts are arranged to engage fixed contacts 27 and 28 respectively arranged in spaced relation with reference to each other on opposite sides of the spring 17.

The contacts 27 and 28 are secured to brackets 29 and 30, secured to the support 18, by means of screws 31. The bracket 29 is supported above the bracket 30, as shown in Fig. 1, and the brackets are formed with portions 29a and 30a turned inwardly toward each other and finally terminating in portions 29b and 30b lying one above the other along the axis of the spring 17 with the spring arranged between them. The contacts 27 and 28 are supported by the portions 29b and 30b of the brackets one above the other in positions to be engaged by the movable contacts 25 and 26 respectively carried by the spring. As shown in Fig. 1, the portions 29b and 30b of the brackets are inclined upwardly at an angle which is approximately the same as that which the length of the spring 17 coextensive with these bracket portions makes with the bottom of the case 10. The contact 28, as shown, is adjustable with reference to the contact 27.

The bimetallic bar 13 is adjusted in its plane of movement by means of a nut 32 threaded to the bolt 19 which extends upwardly through an aperture provided for it in the bimetallic bar 13. A suitable stop 33 is secured to the plate 11 adjacent the free end of the bimetallic bar and arranged to limit the upward movement of the bar. The stop 33 is secured to the plate by means of the rivets 24.

The left-hand ends of the brackets 29 and 30 and the left-hand end of the spring 17 are projected toward the left beyond the end of the insulating block 18, as shown in Figs. 1 and 3. These projecting ends of the members function as terminals through which electrical connections can be made. The connections are directed into the casing 10 through an aperture 34 provided for them in the bottom wall of the casing. It will be understood that the switch contacts 25 and 26 carried by the spring member 17 cooperating with the contacts 27 and 28 control electric circuits connected with the brackets and with the spring member, whereby when the contact 25 engages the fixed contact 27 a circuit will be completed through the spring member and the bracket 29, whereas when the contact 26 engages the contact 28 the circuit connected with the bracket 30 and the spring 17 will be completed.

In the operation of the thermal control device shown in Figs. 1, 2 and 3, the thermostat bar 13 will distort so as to move downwardly responsively to increases in temperature. The spring 17 by reason of its curvature applies a force to the bar through the stud 16 resisting the pressure of the bar to move downwardly. Upon the occurrence of a predetermined high temperature, however, the force of the bimetallic bar overcomes the resistance of the spring and the bar begins to move in a downward direction. The resisting force of the spring 17 to the pressure of the thermostat bar decreases as the bar moves downwardly more rapidly than does the thermostat pressure on the spring with the result that the bar and spring move quickly or snap from their controlling positions shown in Fig. 1 wherein the contacts 25 and 27 are closed to their lower controlling positions wherein the contacts 26 and 28 are closed. The spring 17, however, by reason of its position in the casing 10 continuously applies a decreased force to the thermostat bar tending to return it to its initial position shown in Fig. 1.

When the temperature of the bar decreases, the bar distorts in the reverse direction, whereby it presses on the spring with a decreasing force until eventually when the temperature decreases to a predetermined minimum, the pressure of the bar will have become slightly less than the force of the spring and the spring will thereupon move the bar back toward its initial position shown in Fig. 1. The force of the spring, which decreased as the thermostat moved from its position in Fig. 1 to its lower controlling position at a more rapid rate than the pressure of the bar decreased, now increases more rapidly than the resisting pressure of the bimetallic bar so that the spring snaps or moves quickly to open the contacts 26 and 28 and to close the contacts 25 and 27.

The principle of operation of the thermal control device thus described is illustrated in Figs. 4 and 5. In Fig. 4, the flat spring 17 is shown as a full line, indicated by the numeral 1; this line illustrates the position that the spring occupies in Fig. 1. If the upper contact 25 is removed, the spring will assume the position shown in dotted lines indicated by the numeral 2, and there it will remain unless a force is applied to its upper side sufficient to move it. If the lower contact 28 be removed, and a force applied to the upper side of the spring sufficient to overcome its resistance, the spring will move under the influence of the force to some "critical" or "neutral" position from which it will snap to the dotted line position indicated by the numeral 3, where it will remain until moved upwardly by the application of a force to its under side sufficient to overcome its resistance.

Fig. 5 illustrates the force-distance diagram of the spring in moving from its dotted line position 2 to its dotted line position 3. The positive forces, namely, the forces required to move the spring from its position 2 to its critical position are plotted above the axis $x$—$x$ on the axis $y$—$y$ while the negative forces, that is, the forces of the spring available for work while it moves from its critical to its position 3 are plotted below the $x$—$x$ axis on the axis $y$—$y$. The critical position of the spring is indicated by the numeral 4 where the $x$—$x$ and $y$—$y$ axes intersect.

In this invention, it is contemplated that the motion of the spring 17 will be confined to the positive side of the $x$—$x$ axis, that is, that the spring will not be moved through its critical or neutral position. Thus, it is contemplated that some distance, such as A between the points 5 and 6 on the positive side of the curve, will be used. This is accomplished by positioning the upper and lower fixed contacts 27 and 28 to limit the upward and downward movement of the spring to this portion of the curve. The upper contact 27 limits the upward movement of the spring so that in its uppermost position, it occupies the position shown in Fig. 1, and indicated by the numeral 1 in Fig. 4, and in its lowermost position occupies the dotted line position 7 of Fig. 4. By reason of this arrangement, the spring 17 never snaps through its critical or neutral position 4, but always exerts a force upwardly on the bimetallic bar 13. Thus, when the bar 13 in response to increase in temperature tends to move downwardly, and upon the occurrence of a predetermined maximum temperature does overcome the resistance of the spring 17 and start to move downwardly, the resisting force of the spring decreases as the spring is moved from its position 5 to its position 6, as shown in Fig. 5. This relatively rapid decrease in the resisting force of the spring results in the quick or snap movement of the spring and thermostat to their lower controlling positions. It is true that the force-distance characteristics of the bimetallic bar 13 are such that the pressure applied by the bar decreases as it approaches its lower controlling position, but it does not decrease nearly as rapidly as does the resisting force of the spring 17 with the result that the spring is quickly snapped to its lower controlling position.

When the bar 13 distorts in the reverse direction in response to decrease in temperature and starts to move upwardly, the spring 17 forces it upwardly to its position shown in Fig. 1 with a rapidly increasing force as indicated on the force-distance curve of Fig. 5.

In order to vary the average temperature held by the thermostat, the position of the bar 13 in its plane of movement is changed by adjusting the knob 32. If the knob is turned to depress the bar, the temperature maintained by the device will be decreased, whereas the temperature maintained will be increased by turning the knob to permit the bar to move upwardly in its plane of movement under the influence of the spring 17.

The temperature range between the maximum temperature at which the contacts 25 and 27 are opened and the contacts 26 and 28 are closed and the minimum temperature at which the reverse switching action takes place is controlled by adjusting the position of the stud 16 on the bimetal bar 13.

The shape of the force-distance curve of the spring shown in Fig. 5 can be varied widely by adjusting the position of the stud 16 on the bar 13, and can be caused to bear a desired relation over a relatively wide range to the force-distance characteristics of the bar 13. If the stud 16 be moved toward the right, as viewed in Figs. 1 and 3, the portion A of the curve becomes steeper, as illustrated by the dotted line in Fig. 5. As a result the snap action of the device becomes more pronounced and the temperature range is increased. Conversely, the temperature range is decreased if the stud 16 is adjusted toward the left.

It is to be understood that the spring 17 may be operated between its controlling positions by means of a flexible spring to which suitable forces are applied, rather than by means of the bimetallic bar 13, provided the spring has suitable force-distance characteristics. Thus, for example, an operating spring may be positioned, as is the bimetal bar 13 of Figs. 1 and 3, and arranged to carry a stud similar to the stud 16 to bear on the spring 17, and further, the screw 32, or a similar member, may be used to apply an operating force to the operating spring. If the operating spring has a force-distance characteristic such that when a force is applied to the spring to operate the spring 17 to its lower position, the resisting force of the spring 17 decreases with greater rapidity than the force applied to it by the operating spring, then the system will operate with a snap-action as described in the form of the invention shown in Figs. 1, 2 and 3.

In Figs. 6, 7 and 8, a slightly modified form of this invention is illustrated. This form of the invention comprises a metallic frame or base 35. One end 35a of this frame is turned downwardly at right angles to the general plane of the frame, as shown in Fig. 6, while its opposite end 35b is formed in the shape of a U, as clearly shown in this figure. In this form, the flat flexible spring 36 is rigidly secured at its right-hand end to the form 35 by means of a screw 37. The opposite end of the spring is formed with a knife-edge which rests within a bearing seat 38 provided for it in the end portion 35a. Preferably, the central portion of this end of the spring will be provided with a tongue 39 which projects through a slit provided for it in the frame. It will be observed that the spring 36 is supported within the frame 35 so that its curvature is similar to the curvature of the spring 17 of Figs. 1, 2 and 3.

A bimetallic bar 40 is supported on the frame by means of the spring 36, a bracket 41 and an adjusting screw 42. The bracket 41 is secured to the frame 35 by means of the screw 37 and has a depending portion 41a which is U-shaped and which receives the thermostat 40 between the legs of the U. The right-hand end of the bar is provided with an aperture which receives a stud 43 rigidly attached to the lower end of the adjusting screw 42. This adjusting screw is threaded into the upper and lower legs of the U-shaped end 35b of the frame. The free end of the bimetallic bar carries a stud or abutment 44 which bears upon the spring 36 adjacent its left-hand end which is received in the knife-edge bearing 38. It will be observed that the right-hand end of the bimetallic bar 40 is forced against the screw 42 by reason of the fact that its left-hand end is forced downwardly by the spring 36, the intermediate portion of the spring bearing on the bottom of the depending bracket 41a. The position of the bar 40 is changed in its plane of movement by adjusting the position of the screw 42. This screw preferably will be provided with a knurled operating knob 42a.

In this form of the invention, the movable switch contacts are not carried by the spring member 36, and furthermore, only one set of contacts will be used. The switch comprises a pair of laterally spaced fixed contacts 45 which are carried on a pair of brackets 46. These brackets are secured to the frame 35 by means of rivets 47 and are insulated from the frame by a sheet of insulating material 48 formed of mica. Terminal members 49 pass through apertures provided for them in the frame 35 and the sheet of mica 48 and contact the brackets 46. These members are in the form of bolts, the heads of which engage the brackets 46, and the ends of which project upwardly through the brackets and the frame. The bolts are secured to the frame by means of nuts 50. The upper heads of the rivets 47 and the nuts 50 are electrically insulated from the frame 35 by means of a sheet of mica 51.

Cooperating with the fixed contacts 45 is a bridging contact 52 which is carried by a flexible spring arm 53. This arm 53 is rigidly secured to a tongue 54 formed integrally with the frame 35 and forced downwardly from the frame, and is arranged to bias the bridging contact to its closed position as shown in Fig. 6. The bridging contact 52 is electrically insulated from the switch arm 53 in any suitable manner, as by means of sheets 55 formed of mica. The bridging contact 52 is mechanically connected with the spring 36 by means of a yoke 55a (Fig. 8). This yoke, as shown, is provided with a tongue 55b which is rigidly secured to the free end of the resilient arm 53. Preferably, the mica sheets 55 and the tongue 55b will be riveted to the arm 53. The spring 36, as shown in Fig. 6, is directed through the center of the yoke. The yoke is provided with projections 55c on its upper and lower sides arranged to engage the opposite sides of the spring 36. These bearings are spaced apart a distance somewhat greater than is the thickness of the spring 36 for a purpose to be described in greater detail hereinafter.

The fixed contact 45 constitutes a limit for movement of the spring 36 in a downward direction, while a stop 56 formed on the frame 35 constitutes a stop for limiting the movement of the spring 36 in an upward direction.

The thermal control shown in Figs. 6, 7 and 8 operates in substantially the same fashion as the form shown in Figs. 1, 2 and 3. In this case, however, the thermal bar 40 tends to move upwardly in response to increases in temperature and tends to move downwardly in response to decreases in temperature. The spring 36 resists movement of the bar 40 upwardly until the occurrence of a predetermined maximum temperature when the pressure of the bar 40 on the spring 36 will overcome the resisting force of the spring, and the bar will start to move upwardly. In this case, as before, the spring 36 will constantly resist the movement of the bar 40 upwardly, but with a rapidly decreasing force, with the result that the bar and spring 36 will snap quickly to open the contacts 45 and 52. When the temperature of the bar 40 decreases to a predetermined minimum, the spring 36 will move the thermostat 40 toward its position shown in Fig. 6 with a force that increases rapidly so as to snap the switch contacts closed.

Because of the provision of clearance between the spring 36 and the yoke bearings 55c, the spring 36 when moving between its controlling positions engages the bearings with slight hammer blows so as to accentuate the snap movement of the movable contact 52 between its open and closed positions.

Temperature adjustment is secured by adjusting the position of the screw 42, while the amplitude between the temperature at which the switch is opened and the temperature at which the switch is again closed is controlled by varying the position of the stud 44 longitudinally on the bimetallic bar 40.

While I have shown particular embodiments of my invention, it will be understood, of course, that I do not wish to be limited thereto since many modifications may be made, and I therefore contemplate by the appended claims to cover any such modifications as fall within the true spirit and scope of my invention.

What I claim as new and desire to secure by Letters Patent of the United States, is,—

1. A temperature control device comprising a thermostat arranged to move between a pair of controlling positions in response to changes in temperature, a spring, means supporting said spring to give it a predetermined curvature from which it tends to move to a predetermined position in one direction and resists movement from said position toward a second predetermined position of reverse curvature up to a critical position from which it will snap to said second position of reverse curvature, the resistance of said spring to movement from said first position to said critical position decreasing as said spring approaches said critical position, means limiting the movement of said spring between predetermined limits lying within its range of movement between said first position and said critical position, and means operably associating said spring with said thermostat so that said spring resists movement of said thermostat in response to a temperature change from one of said controlling positions to the other with a force that continually decreases as the thermostat moves from said one to said other position and to apply to said thermostat a force of continually increasing magnitude while said thermostat returns to said one position in response to a reverse temperature condition.

2. A temperature control device comprising a bimetallic thermostat bar having one end fixed and its other end free to move to one position in response to an increase in temperature and to another position in response to a decrease in temperature, a flexible spring substantially coextensive with said bar having its one end fixed corresponding to the fixed end of said thermostat bar and its opposite end resting in a fixed bearing seat removed from the plane of said fixed end so as to give said spring a reverse curvature of predetermined form, said opposite end being arranged adjacent said free end of said bar, a mechanical connection between said spring and said thermostat bar, said spring having a shape so as to resist movement of said bar to said one position in response to increase in temperature with a force that constantly decreases in magnitude and to apply a force to said bar that constantly increases in magnitude when said bar tends to move to said other position in response to decreases in temperature and a switch operably associated with said spring so as to be operated thereby.

3. A temperature control device comprising a flat flexible spring, means rigidly supporting one end of said spring, a bearing for the opposite end of said spring supporting said end with reference to the fixed end so as to give said spring a predetermined curvature from which it tends to move to a predetermined position in one direction and resists movement from said position toward a second predetermined position of reverse curvature up to a critical position from which it will snap to said second position of reverse curvature, the resistance of said bar to move from said first position to said critical position decreasing as said bar approaches said critical position, stops limiting the movement of said spring between predetermined limits lying within its range of movement between said first position and said critical position so that said spring constantly resists movement toward the critical position from one to the other of said limiting positions and with a force that constantly decreases in magnitude and which returns to said first limiting position away from said critical position with a force that constantly increases in magnitude, a temperature responsive bar operable in a predetermined plane of movement between controlling positions responsive to changes in temperature, a member carried by said bar engaging said spring so that said spring resists movement of said bar to one controlling position with a constantly decreasing force and moves said bar to another controlling position with a constantly increasing force, means for varying the position of said member carried by said bar relative to said spring and means for varying the position of said bar in its plane of movement.

4. A temperature control device comprising a thermostat bar arranged to move between a pair of controlling positions in response to changes in temperature, a flat, flexible control spring, means supporting said spring to give it a predetermined curvature and operably associating it with said bar to resist its movement in response to a temperature change from one of said positions to the other with a force that constantly decreases as the bar moves from said one to said other position and to apply to said bar a force of constantly increasing magnitude while said bar returns to said one position in response to a reverse temperature condition, a fixed switch contact, a second switch contact, a flexible spring member carrying said second contact for engagement with said first contact and a loose connection between said flexible spring member and said control spring arranged so that said contacts are operated into and out of engagement by operation of said thermostat bar.

5. A control device comprising a flat, flexible spring, means rigidly supporting one end of said spring, a bearing for the opposite end of said spring supporting said end with reference to the fixed end so as to give said spring a predetermined curvature from which it tends to move to a predetermined position in one direction and resists movement from said position toward a second predetermined position of reverse curvature up to a critical position from which it will snap to said second position of reverse curvature, the resistance of said bar to move from said first position to said critical position decreasing as said bar approaches said critical position, stops limiting the movement of said spring between predetermined limits lying within its range of movement between said first position and said critical position so that said spring constantly resists movement toward the critical position from one to the other of said limiting positions and with a force that constantly decreases in magnitude and which returns to said first limiting position away from said critical position with a force that constantly increases in magnitude, and a force applying member operably associated with said spring to apply a force to it to move it to its limiting position toward said critical position and to release it to provide for its movement to the limiting postion away from said critical position.

6. A temperature control device comprising a temperature responsive member movable between controlling positions in response to changes in temperature, a flat, flexible spring, means supporting said spring to give it a predetermined curvature from which it tends to move to a predetermined position in one direction and resists movement from said position toward a second predetermined position of reverse curvature up to a critical position from which it will snap to said second position of reverse curvature, the resistance of said bar to movement from said first position to said critical position decreasing as said bar approaches said critical position, stops on opposite sides of said spring limiting the movement of said spring between predetermined limits lying within its range of movement between said first position and said critical position, and means operably associating it with said temperature responsive member so that said spring applies a force of decreasing magnitude to said member as the member moves from one to the other of said positions.

7. A temperature control device comprising a support, a flat, flexible spring, means fixedly securing one end portion of said spring to said support so that said end portion lies in a predetermined fixed plane, a bearing seat receiving the opposite end of said spring positioned in a plane removed from the plane of said fixed end so that said spring takes a curvature of predetermined form from which it tends to move in a predetermined direction, a stop limiting the movement of said spring in said predetermined direction, and a temperature responsive member arranged to control the position of said spring.

8. A temperature control device comprising a support, a flat, flexible spring, clamping means fixedly securing one end portion of said spring to said support so that said end portion lies in a predetermined fixed plane, a fixed bearing seat lying in a predetermined plane removed from the plane of said fixed end receiving the other end of said spring so that said spring takes a reverse curvature of predetermined form, and a temperature responsive member arranged to change its position in response to temperature changes bearing on said spring at a point adjacent said bearing seat, the said spring resisting movement of said temperature responsive member in one direction from one controlling position to another with a constantly decreasing force, and with a constantly increasing force when said member moves in the reverse direction to said one position.

9. A control device comprising a flexible spring, means supporting said spring so as to give said spring a predetermined curvature from which it tends to move to a predetermined position in one direction and resists movement from said position toward a second predetermined position of reverse curvature up to a critical position from which it will snap to said second position of reverse curvature, the resistance of said bar to movement from said first position to said critical position decreasing as said bar approaches said critical position, means limiting the movement of said spring between predetermined limits lying within its range of movement between said first position and said critical position so that said spring constantly resists movement toward the critical position from one to the other of said limiting positions and with a force that constantly decreases in magnitude and which returns to said first limiting position away from said critical position with a force that constantly increases in magnitude, and a force applying member operably associated with said spring to apply a force to it to move it to its limiting position toward said critical position and to release it to provide for its movement to the limiting position away from said critical position.

THEODORE A. RICH.